United States Patent
Lai et al.

(10) Patent No.: US 9,699,839 B2
(45) Date of Patent: Jul. 4, 2017

(54) MULTICHANNEL CONSTANT CURRENT LED CONTROLLING CIRCUIT AND CONTROLLING METHOD

(71) Applicant: Silergy Semiconductor Technology (Hangzhou) LTD, Hangzhou, ZheJiang Province (CN)

(72) Inventors: Hongbin Lai, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/821,973

(22) Filed: Aug. 10, 2015

(65) Prior Publication Data
US 2016/0044759 A1 Feb. 11, 2016

(30) Foreign Application Priority Data
Aug. 11, 2014 (CN) .......................... 2014 1 0393100

(51) Int. Cl.
*H05B 33/08* (2006.01)

(52) U.S. Cl.
CPC ..... *H05B 33/0815* (2013.01); *H05B 33/0827* (2013.01); *H05B 33/0866* (2013.01); *Y02B 20/347* (2013.01)

(58) Field of Classification Search
CPC ............ H05B 33/0848; H05B 33/0818; H05B 33/0815; H05B 33/0827; H05B 33/0851; H05B 33/03; H05B 33/0809; H05B 33/0821; H05B 33/0884; H02J 4/00; G09G 3/3406; Y02B 20/347; Y02B 20/341

See application file for complete search history.

(56) References Cited

U.S. PATENT DOCUMENTS

| | | | |
|---|---|---|---|
| 8,344,653 B2 | 1/2013 | Lee et al. | |
| 8,471,483 B2 | 6/2013 | Lee et al. | |
| 8,653,749 B2 | 2/2014 | Hwang et al. | |
| 2011/0227489 A1* | 9/2011 | Huynh | H05B 33/083 315/185 R |
| 2013/0162162 A1* | 6/2013 | May | H05B 37/02 315/224 |

* cited by examiner

*Primary Examiner* — Alexander H Taningco
*Assistant Examiner* — Seokjin Kim
(74) *Attorney, Agent, or Firm* — Michael C. Stephens, Jr.

(57) ABSTRACT

A multichannel constant current LED controlling circuit can include: (i) a control loop configured to generate a first control signal in accordance with a current feedback signal that represents a driving current flowing through an LED load, where the LED load comprises a plurality of LED strings coupled in series; (ii) a loop steady state network comprising a plurality of steady state holding components configured to hold a plurality of steady state control signals that correspond to a plurality of load states of the LED load, where when a state of the LED load varies, at least one of the steady state holding components is selected by the control loop to generate the first control signal; and (iii) a power switching transistor of a power stage circuit configured to generate a pseudo-constant output current to drive the LED load.

17 Claims, 11 Drawing Sheets

MULTICHANNEL CONSTANT CURRENT LED CONTROLLING CIRCUIT AND CONTROLLING METHOD

RELATED APPLICATIONS

This application claims the benefit of Chinese Patent Application No. 201410393100.5, filed on Aug. 11, 2014, which is incorporated herein by reference in its entirety.

FIELD OF THE INVENTION

The present disclosure generally relates to the field of LED controllers, and more particularly to multichannel constant current LED controlling circuits and associated methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

SUMMARY

In one embodiment, a multichannel constant current LED controlling circuit can include: (i) a control loop configured to generate a first control signal in accordance with a current feedback signal that represents a driving current flowing through an LED load, where the LED load comprises a plurality of LED strings coupled in series; (ii) a loop steady state network comprising a plurality of steady state holding components configured to hold a plurality of steady state control signals that correspond to a plurality of load states of the LED load, where when a state of the LED load varies, at least one of the steady state holding components is selected by the control loop to generate the first control signal; and (iii) a power switching transistor of a power stage circuit configured to generate a pseudo-constant output current to drive the LED load.

In one embodiment, a method of controlling a plurality of LED strings can include: (i) generating, by a control loop, a first control signal in accordance with a current feedback signal representing a driving current flowing through an LED load, where the LED load comprises a plurality of LED strings coupled in series; (ii) holding, by a plurality of steady state holding component in a loop steady state network, a plurality of steady state control signals corresponding to a plurality of load states of the LED load; (iii) selecting at least one of the steady state holding components by the control loop for generating the first control signal when a state of the LED load varies; and (iv) generating, by a power switching transistor of a power stage circuit, a pseudo-constant output current to drive the LED load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In various direct lighting and backlighting applications, light-emitting diode (LED) strings can be connected in series or in parallel, and each of which can include one or more LED beads connected in series. The luminance of an LED bead may be determined by a current flowing through the LED bead or single light. Therefore, a constant current LED controlling circuit may be employed in order to control the current flowing through the LED strings to be substantially constant to maintain stable luminance. In some approaches, a constant current LED controlling circuit may be applied to drive a single LED string. In one multichannel constant current LED driving circuit, each LED string may be separately driven by a constant current through one corresponding constant current LED controlling circuit.

Figure 1:
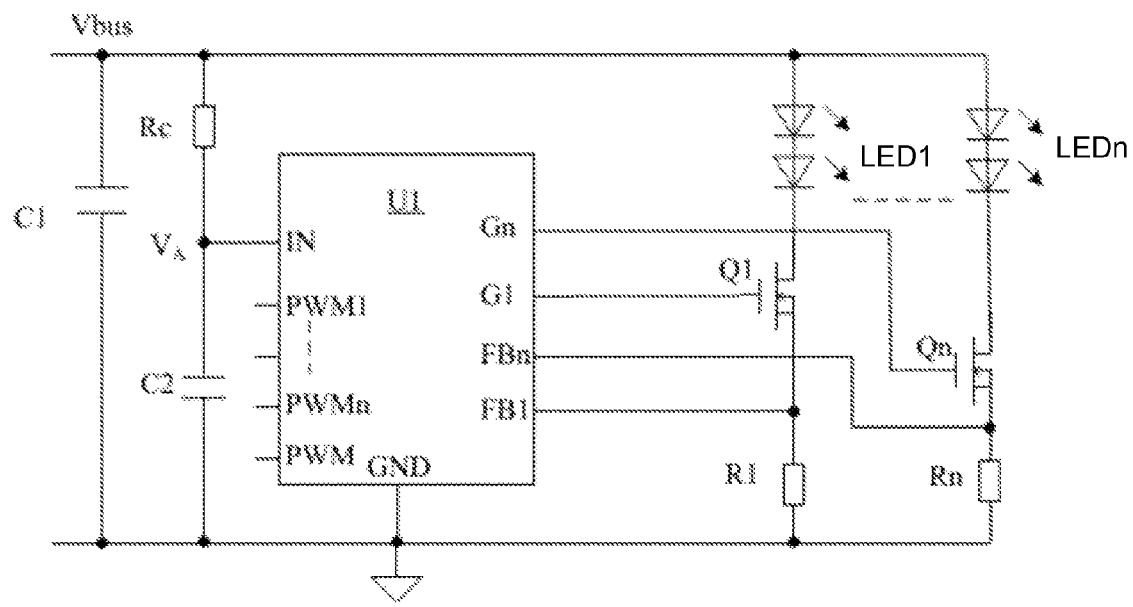
FIG. 1 is a schematic block diagram of an example constant current LED driving circuit.

Referring now to FIG. 1, shown is a schematic block diagram of an example constant current LED driving circuit. For example a plurality of LED strings can be coupled in parallel and separately driven by a constant current through one corresponding linear regulation circuit that is connected in series with the given LED string. Because multiple independent constant current LED controlling circuits or linear regulation circuits should be employed in this example, such multichannel constant current LED controlling circuits may have increased costs, larger volumes, lower efficiencies, and increased power limitations.

When multiple LED strings are connected in series and only one constant current LED controlling circuit is employed to provide a driving current, the amount/cost of the constant current LED controlling circuit can be decreased. If one constant current LED controlling circuit is employed to control an LED load that includes a plurality of LED strings coupled in series, when every LED string is turned on or off, the load state can be changed. The loop response speed of a typical constant current LED controlling circuit may not meet the load requirements, and possible side effects include constant current control accuracy and efficiency, as well as possible damage the LED strings due to surged driving current. Therefore, such constant current LED controlling circuits may not be suitable to achieve constant current control for an LED load that includes a plurality of LED strings coupled in series.

Figure 2:
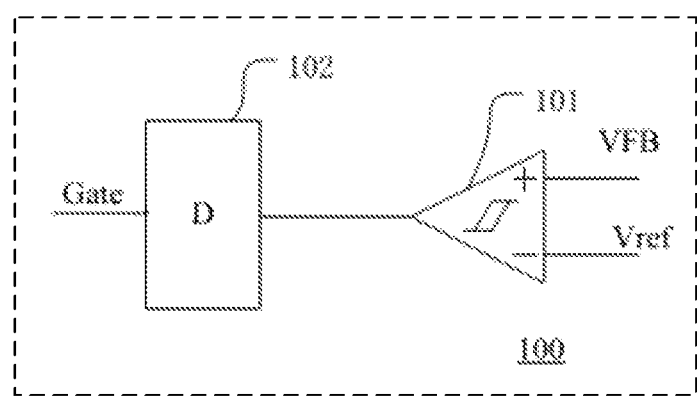
FIG. 2 is a schematic block diagram of an example constant current LED controlling circuit employing a hysteresis control mode.

Referring now to FIG. 2, shown is a schematic block diagram of an example constant current LED controlling circuit employing a hysteresis control mode. Constant current LED controlling circuit 100 can include hysteresis comparator 101 and flip-flop 102. A non-inverting input terminal of hysteresis comparator 101 can connect to an external current sensing circuit (e.g., including a sensing resistor), and may receive current feedback signal VFB. An inverting input terminal of hysteresis comparator 101 can receive reference voltage Vref, and an output terminal can connect to flip-flop 102. An output terminal of flip-flop 102 can connect to a power switching transistor, and may provide a controlling signal ("Gate") to the power switching transistor.

During operation of a constant current LED controlling circuit, when current feedback signal VFB is less than reference voltage Vref, an output of hysteresis comparator 101 may be high. Therefore, an output of flip-flop 102 can be high to turn on the power switching transistor. In this case, an inductor may be charged to increase an inductor current, and current feedback signal VFB can correspondingly increase. When current feedback signal VFB reaches a level of reference voltage Vref, hysteresis comparator 101 may maintain its original state until current feedback signal VFB reaches a predetermined upper limit (VH) due to the hysteresis comparator characteristics. Then, hysteresis comparator 101 may transition to pull down its output to turn off the power switching transistor. Therefore, the inductor can be discharged to decrease the inductor current, and current feedback signal VFB can accordingly be decreased. In this way, a switching period may be completed, and cycle by cycle, a constant output current may be achieved by constant current LED controlling circuit 100 in accordance with current feedback signal VFB.

This type of hysteresis current control mode may be widely applied for constant current LED drivers. However, when there is some delay for the control system, and when an input voltage and an output voltage change, an error of the output current can occur, which may decrease control accuracy. In addition, when in a light load condition, the constant current LED driving circuit may operate at a discontinuous current mode (DCM), which may decrease the accuracy of the constant current control. In this case, the frequency may significantly change and can decrease the efficiency when the load changes.

Figure 3:
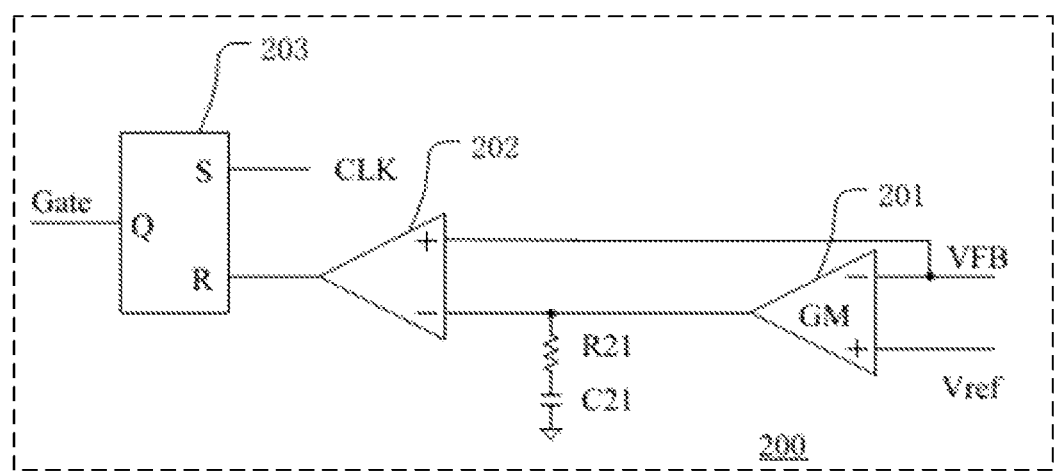
FIG. 3 is a schematic block diagram of an example constant current LED controlling circuit employing a constant frequency control mode.

Referring now to FIG. 3, shown is a schematic block diagram of an example constant current LED controlling circuit employing a constant frequency control mode. Constant current LED controlling circuit 200 can include transconductance amplifier 201 and a corresponding compensation circuit (e.g., including resistor R21 and capacitor C21), comparator 202, and RS flip-flop 203. An inverting input terminal of transconductance amplifier 201 can connect to a current sensing circuit (e.g., including a sensing resistor), and may receive current feedback signal VFB. A non-inverting input terminal of transconductance amplifier 201 can receive reference voltage Vref, and may generate a current error signal. The current error signal can be compensated by the compensation circuit to generate a compensation signal. A non-inverting input terminal of comparator 202 can receive current feedback signal VFB, and an inverting input terminal may receive the compensation signal. An output of comparator 202 can connect to a reset terminal of RS flip-flop 203, and a set terminal of RS flip-flop 203 can receive clock signal CLK. A power switching transistor can connect to an output terminal of RS flip-flop 203 to receive control signal Gate.

During operation of constant current LED controlling circuit 200, the power switching transistor can be turned off by RS flip-flop 203 in accordance with clock signal CLK to start a switching period. The current error signal generated by transconductance amplifier 201 may be in direct proportion with the error between reference voltage Vref and current feedback signal VFB, and may be compensated by the compensation circuit to generate the compensation signal. Comparator 202 can compare current feedback signal VFB against the compensation signal.

When current feedback signal VFB is less than the compensation signal, an output of comparator 202 may be high. When current feedback signal VFB reaches the level of the compensation signal, the output of comparator 202 may transition. An output of RS flip-flop 202 can be determined by the output signal of comparator 202 and clock signal CLK. When the output of RS flip-flop 202 is high, the power switching transistor may be turned on to charge an inductor. Therefore, an inductor current may increase, and current feedback signal VFB can correspondingly increase. When the output of RS flip-flop 202 is low, the power switching transistor may be turned off to discharge the inductor. Therefore, the inductor current can decrease, and current feedback signal VFB may correspondingly decrease. In this way, a substantially constant output current may be achieved by constant current LED driver 200 in accordance with current feedback signal VFB.

According to the above peak current control mode, the pulse-width modulation (PWM) duty cycle of control signal Gate can be controlled by controlling the peak inductor current. When the output voltage changes, a surge of the LED driving current can occur, and this may damage the LED load. In addition, when the PWM dimming signal is relatively small, there can be a surge of the LED driving current, which can make the LED load flicker. Further, when in a light load condition (e.g., the load is shorted), there may be a relatively large steady state loss.

Figure 4:
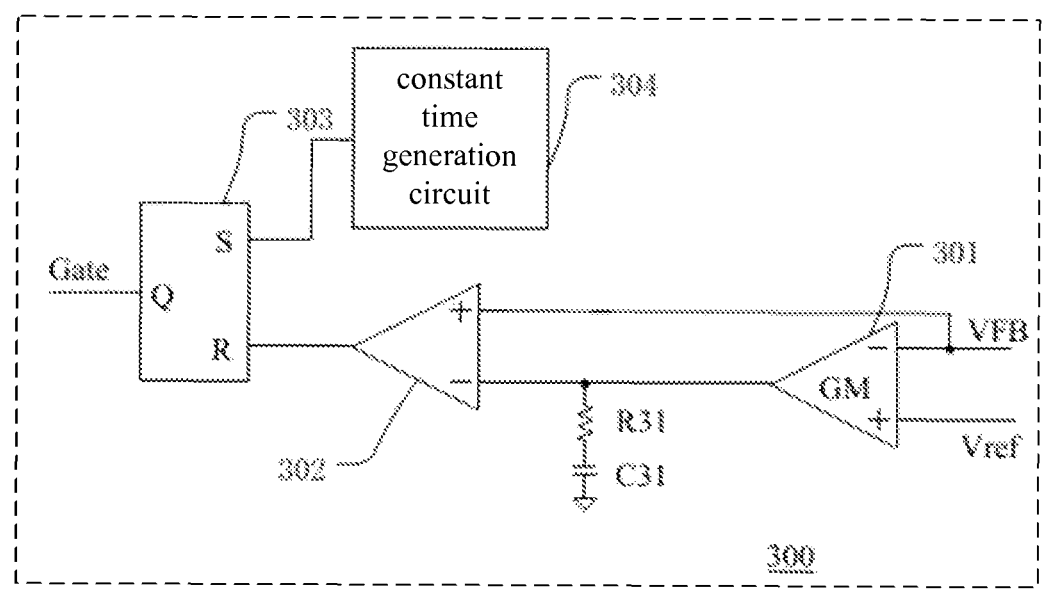
FIG. 4 is a schematic block diagram of an example constant current LED controlling circuit employing a constant off time control mode.

Referring now to FIG. 4, shown is a schematic block diagram of an example constant current LED controlling circuit employing a constant off time control mode. Constant current LED controlling circuit 300 can include transconductance amplifier 301 and corresponding compensation circuit, comparator 302, RS flip-flop 303, and constant time generation circuit 304. An inverting input terminal of transconductance amplifier 301 can connect to a current sensing circuit (e.g., including a sensing resistor), and may receive current feedback signal VFB. A non-inverting input terminal of transconductance amplifier 301 can receive reference voltage Vref. A current error signal can be generated at an output of transconductance amplifier 301.

Capacitor C21 and resistor R21 can connect in series between the output of transconductance amplifier 301 and ground to form the compensation circuit. In other cases, the compensation circuit may only include capacitors. The current error signal may be compensated by the compensation circuit in order to generate the compensation signal. A non-inverting input terminal of comparator 302 can receive current feedback signal VFB, and an inverting input terminal may receive the compensation signal. An output of comparator 302 can connect to a reset terminal of RS flip-flop 303, and a set terminal of RS flip-flop 303 can connect to constant time generation circuit 304 to receive a timing signal with a fixed time interval. An output terminal of RS flip-flop 303 can connect to a power switching transistor, and may provide control signal Gate to the power switching transistor.

During operation of constant current LED controlling circuit 300, when the system is powered on, the power switching transistor may be turned on by flip-flop 303 to start a switching period. The current error signal output by transconductance amplifier 301 can be in direct proportion with the error between reference voltage Vref and current feedback signal VFB. The current error signal can be compensated by the compensation circuit in order to generate the compensation signal. For example, the compensation signal may be a triangular waveform or a trapezoid waveform, and the peak value of which can represent a peak inductor current.

Current feedback signal VFB and the compensation signal can be compared by comparator 302. When current feedback signal VFB is less than the compensation signal, an output of comparator 302 may be high. When current feedback signal VFB reaches a level of the compensation signal, the output of comparator 302 can transition. An output signal of RS flip-flop 302 may be determined by the output signal of comparator 302 and an output signal of constant time generation circuit 304. When the output signal of RS flip-flop 302 is high, the power switching transistor can be turned on to charge an inductor. Therefore, an inductor current may increase, and current feedback signal VFB can correspondingly increase. When the output signal of RS flip-flop 302 is low, the power switching transistor may be turned off, and can remain off for a fixed time interval generated by constant time generation circuit 304 to discharge the inductor. Therefore, an inductor current may increase, and current feedback signal VFB can correspondingly increase, and a switching period may be completed. After the fixed time interval, the power switching transistor may again be turned on. In this way, cycle by cycle, a constant output current may be achieved by constant current LED controlling circuit in accordance with current feedback signal VFB.

As compared with the hysteresis control mode discussed above, there may be no subharmonic oscillation when the constant off time control mode is employed to improve the transient response. Therefore, a steady state can be rapidly recovered when the load changes. However, when the load changes, the frequency variation of the control signal (e.g., Gate) may still be undesirably large, and the constant current control accuracy and efficiency may be influenced by the load variation.

In one embodiment, a multichannel constant current LED controlling circuit can include: (i) a control loop configured to generate a first control signal in accordance with a current feedback signal that represents a driving current flowing through an LED load, where the LED load comprises a plurality of LED strings coupled in series; (ii) a loop steady state network comprising a plurality of steady state holding components configured to hold a plurality of steady state control signals that correspond to a plurality of load states of the LED load, where when a state of the LED load varies, at least one of the steady state holding components is selected by the control loop to generate the first control signal; and (iii) a power switching transistor of a power stage circuit configured to generate a pseudo-constant output current to drive the LED load.

Figure 5:
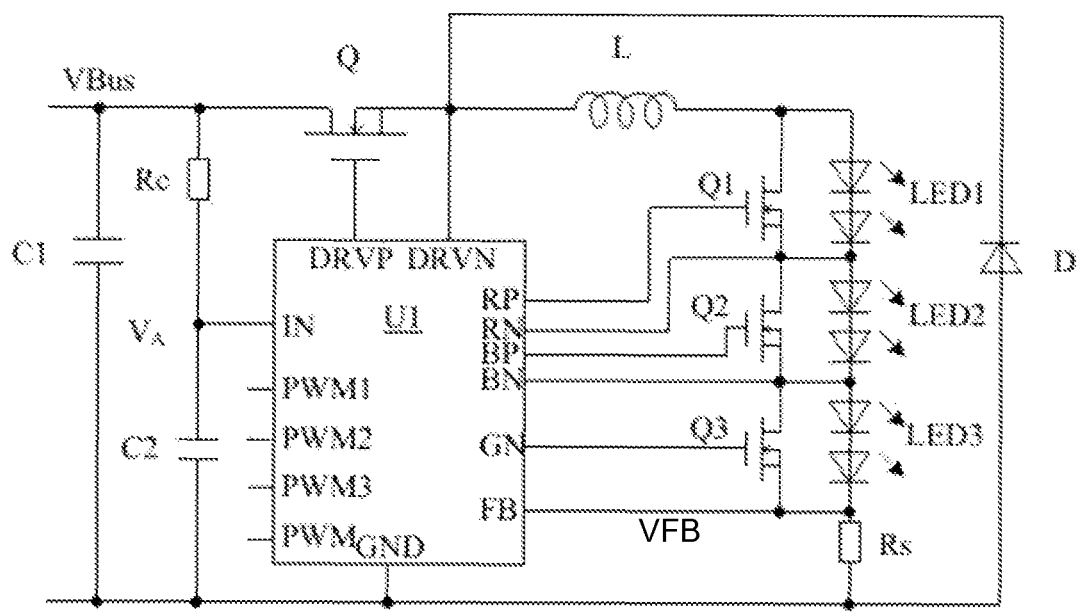
FIG. 5 is a schematic block diagram of an example constant current LED driving circuit, in accordance with embodiments of the present invention.

Referring now to FIG. 5, shown is a schematic block diagram of an example constant current LED driving circuit, in accordance with embodiments of the present invention. In this particular example, three LED strings (e.g., LED1, LED2, and LED3) are coupled in series. The constant current driving circuit can receive DC bus voltage VBus to stably drive the LED strings. The constant current driving circuit can include a power stage circuit that includes power switching transistor Q, inductor L, and a rectifier circuit. For example, the rectifier circuit can include rectifier diode D. Power switching transistor Q, inductor L can and rectifier diode D may be configured to form a Buck topology. Power switching transistor Q and inductor L can connect in series between an input terminal of DC bus voltage VBus and the anode of the LED load, and rectifier diode D can connect between ground and a common node between power switching transistor Q and inductor L.

The constant current driving circuit can further include multichannel constant current LED controlling circuit U1 configured to control an output current of the power stage circuit to be substantially constant by controlling the state of power switching transistor Q in accordance with current feedback signal VFB that represents the output current flowing though the LED load. The value of the output current can be consistent with an expected driving current of the LED load. An average current of each LED string may be controlled in accordance with one corresponding PWM dimming signal by multichannel constant current LED controlling circuit U1, in order to achieve corresponding luminance. For example, PWM dimming signal PWM1 can control the luminance of LED string LED1, PWM dimming signal PWM2 can control the luminance of LED string LED2, and PWM dimming signal PWM3 can control the luminance of LED string LED3.

The constant current driving circuit can include a multichannel switching circuit. As shown in FIG. 5, the multichannel switching circuit can include switching transistor Q1 connected in parallel with LED string LED1, switching transistor Q2 connected in parallel with LED string LED2, and switching transistor Q3 connected in parallel with LED string LED3. Multichannel constant current LED controlling circuit U1 can connect to controlling terminals (e.g., gates) of switching transistors Q1, Q2 and Q3, to control their switching states. Switching transistors Q1, Q2 and Q3 can be controlled to periodically turn off/on corresponding LED strings in accordance with their corresponding PWM dimming signals by multichannel constant current LED controlling circuit U1.

For example, the current feedback signal may be generated by a current sensing circuit that is implemented by sensing resistor Rs connected between the cathode of the LED strings and ground. A voltage signal at the common node between sensing resistor Rs and the LED strings can be configured as current feedback signal VFB. In this particular example, a PWM control signal can be received by multichannel constant current LED controlling circuit U1, and may regulate the value of a reference current signal. The output current of the power stage circuit can be regulated by multichannel constant current LED controlling circuit U1 in accordance with the reference current signal and the current feedback signal. The value of the reference current signal may be in direct proportion with an expected driving current of the LED load. Therefore, the output current of the power stage circuit may be regulated in accordance with the expected driving current of different LED loads. The output current can be regulated in accordance with a comparison between the reference current signal and the current feedback signal.

This example constant current driving circuit can also include a power supply circuit including resistor Rc and capacitor C2, and filtering capacitor C1. One terminal of resistor Rc can connect to the input terminal of the DC bus voltage, and the other terminal can connect to one terminal of capacitor C2. The other terminal of capacitor C2 can connect to ground. Voltage signal $V_A$ at the common node between resistor Rc and capacitor C2 can be configured (e.g., via terminal IN) as a supply voltage to multichannel constant current LED controlling circuit U1.

When the expected driving current of LED strings LED1, LED2, and LED3 is determined, the reference current signal can be regulated by the PWM control signal to match the expected driving current. The state of power switching transistor Q can be controlled in accordance with current feedback signal VFB and the reference current signal by multichannel constant current LED controlling circuit U1 to control the output current of the power stage circuit to be consistent with the expected driving current of LED strings LED1, LED2, and LED3. The luminance of LED strings LED1, LED2, and LED3 may also be different for warm-and-cold lamp applications. Therefore, the duty cycle of the PWM dimming signals can be correspondingly regulated in accordance with the luminance requirement. In addition, an average current of each LED string can be regulated to achieve corresponding luminance by controlling the operation of switching transistors Q1, Q2, and Q3 in accordance with the PWM dimming signals by multichannel constant current LED controlling circuit U1.

In one embodiment, a method of controlling a plurality of LED strings can include: (i) generating, by a control loop, a first control signal in accordance with a current feedback signal representing a driving current flowing through an LED load, where the LED load comprises a plurality of LED strings coupled in series; (ii) holding, by a plurality of steady state holding component in a loop steady state network, a plurality of steady state control signals corresponding to a plurality of load states of the LED load; (iii) selecting at least one of the steady state holding components by the control loop for generating the first control signal when a state of the LED load varies; and (iv) generating, by a power switching transistor of a power stage circuit, a pseudo-constant output current to drive the LED load.

Figure 6:
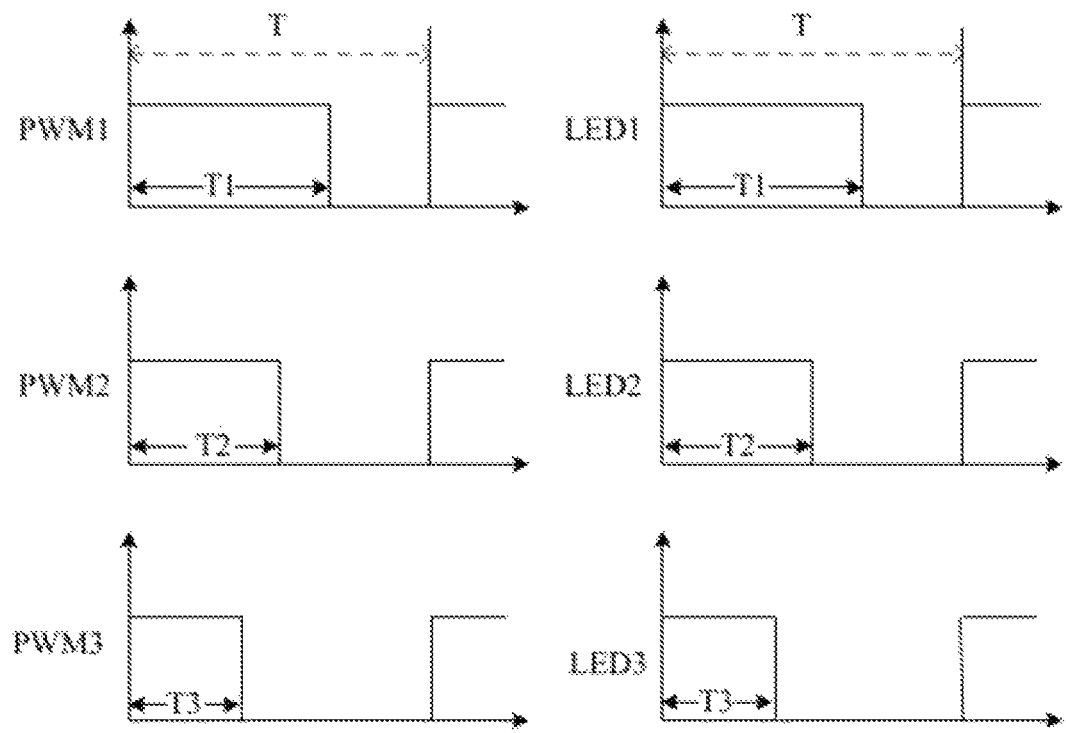
FIG. 6 is a waveform diagram of an example operation of a constant current LED driving circuit, in accordance with embodiments of the present invention.

Referring now to FIG. 6, shown is a waveform diagram of an example operation of a constant current LED driving circuit, in accordance with embodiments of the present invention. In one switching period T, the output current can flow through LED string LED1 in time interval T1, during which time PWM dimming signal PWM1 is active. The output current can flow through LED string LED2 in time interval T2, during which time PWM dimming signal PWM2 is active. Also, the output current can through LED string LED3 in time interval T3, during which time PWM dimming signal PWM3 is active. Therefore, the average current of LED strings LED1, LED2, and LED3 may be regulated to be different in order to achieve different luminance. In this way, luminance of warm-and-cold lamp including three LED strings can be regulated by the above control scheme.

Only one driving circuit may be utilised in order to drive a plurality of LED strings in accordance with the present example. The luminance of each of the LED strings may be regulated by one corresponding PWM dimming signal in order to achieve different luminance of the LED load. In this way, both constant driving current and luminance regulation can be achieved, with a relatively simplified circuit structure, fewer elements, decreased costs and volume, and higher efficiency, as compared to other approaches.

Figure 7:
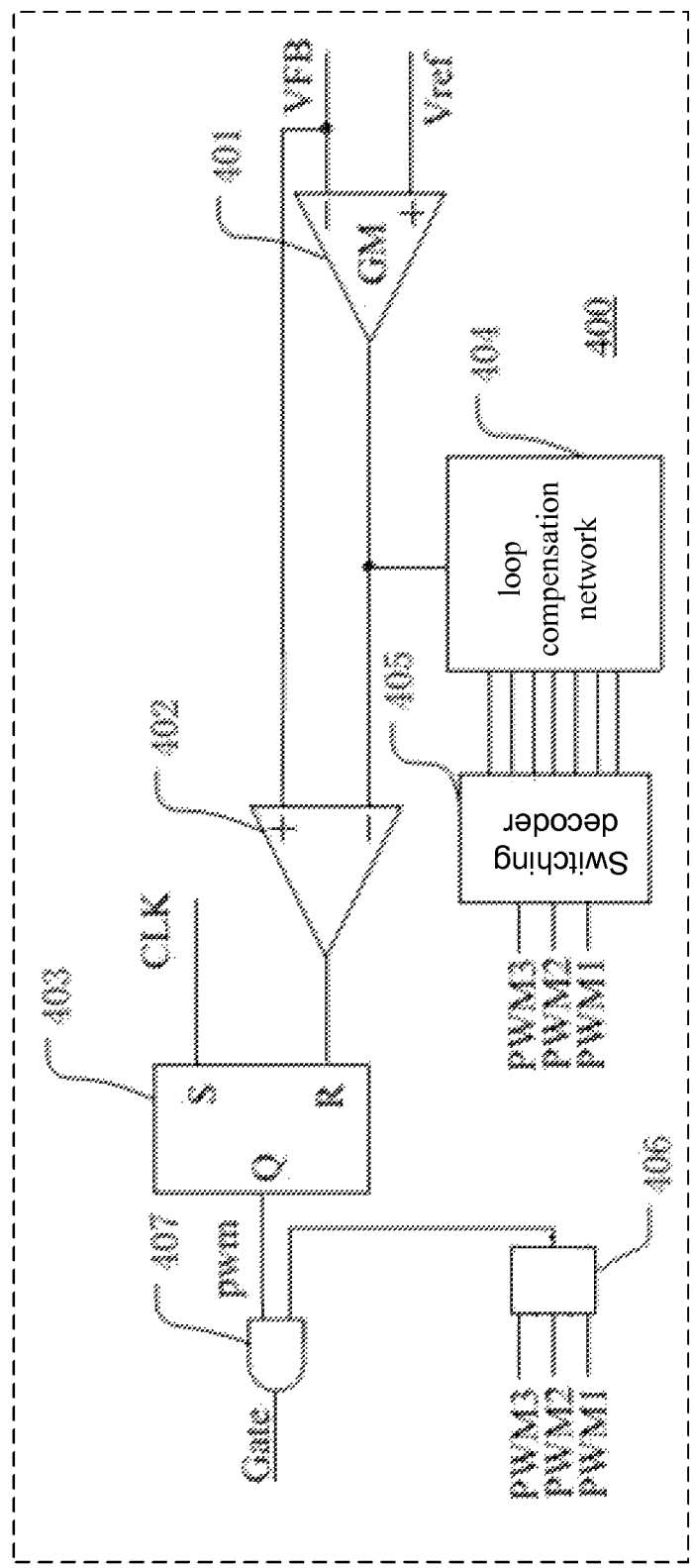
FIG. 7 is a schematic block diagram of an example multichannel constant current LED controlling circuit employing a constant frequency control mode, in accordance with embodiments of the present invention.

Referring now to FIG. 7, shown is a schematic block diagram of an example multichannel constant current LED controlling circuit employing a constant frequency control mode, in accordance with embodiments of the present invention. Constant current LED controlling circuit 400 can include transconductance amplifier 401, loop compensation network 404, comparator 402, and RS flip-flop 403. An inverting input terminal of transconductance amplifier 401 can connect to a current sensing circuit (e.g., including a sensing resistor), and may receive current feedback signal VFB. A non-inverting input terminal of transconductance amplifier 401 can receive reference voltage Vref, and a current error signal may be generated at an output terminal of transconductance amplifier 401.

Loop steady state network 404 can connect between the output terminal of transconductance amplifier 401 and ground. The current error signal can be compensated by loop compensation network 404 to form a compensation signal. A non-inverting input terminal of comparator 402 can receive current feedback signal VFB, and an inverting input terminal of comparator 402 can receive the compensation signal. An output terminal of comparator 402 can connect to a reset terminal of RS flip-flop 403, and a set terminal of RS flip-flop 403 can receive clock signal CLK. And an output terminal of RS flip-flop 403 can connect to switching power transistor Q, and may provide a control signal (e.g., Gate) to control power switching transistor Q.

During operation of constant current LED controlling circuit 400, power switching transistor Q can be turned on to start a switching period through RS flip-flop 403 in accordance with clock signal CLK. The current error signal generated by transconductance amplifier 401 may be in direct proportion with the error between reference voltage Vref and current feedback signal VFB, which can be compensated by loop compensation network 404 to form the compensation signal. A steady state signal of the compensation signal can vary along with the variation of load states of the LED load.

Current feedback signal VFB and the compensation signal can be compared by comparator 402. When current feedback signal VFB is less than the compensation signal, the output signal of comparator 402 can be high. When current feedback signal VFB reaches the level of the compensation signal, the output signal of comparator 402 may transition. An output signal of RS flip-flop 403 can be determined by the output signal of comparator 402 and clock signal CLK. When the output signal of RS flip-flop 403 is high, the power switching transistor Q can be turned on to charge the inductor. Therefore, the inductor current may increase, and current feedback signal VFB can correspondingly increase. When the output signal of RS flip-flop 403 is low, power switching transistor Q can be turned off to discharge the inductor. Therefore, the inductor current may decrease, and current feedback signal VFB can correspondingly decrease. This can complete a switching period, and cycle by cycle, the output current may be maintained to be substantially constant in accordance with current feedback signal VFB.

In particular embodiments, a corresponding steady state holding component of loop compensation network 404 can be selected in accordance with the variation of the LED load, in order to directly obtain a steady state signal. When the LED load varies, and if the LED load initially occurs, a steady state can be obtained by regulation of a plurality of switching periods of multichannel constant current LED controlling circuit 400, and the steady state signal can be stored (e.g., in a register, capacitor, etc.). When the same LED load occurs again, the steady state signal can be directly selected to control the LED driving circuit to rapidly recover to the steady state. Therefore, switching decoder 405 can connect to loop compensation network 404 in order to set the steady state signal of the compensation signal in accordance with PWM dimming signals PWM1, PWM2, and PWM3.

Figure 8:
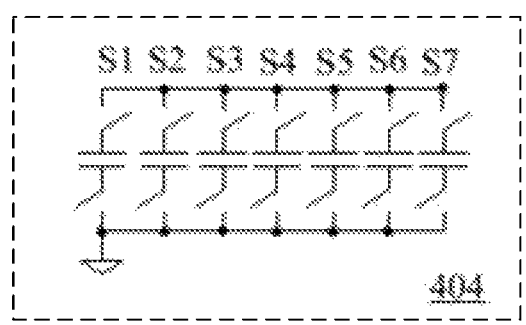
FIG. 8 is a schematic block diagram of an example loop compensation network employed in a multichannel constant current LED controlling circuit, in accordance with embodiments of the present invention.

Referring now to FIG. 8, shown is a schematic block diagram of an example loop compensation network employed in a multichannel constant current LED controlling circuit, in accordance with embodiments of the present invention. In this example, loop steady state/compensation network 404 can include seven steady state holding components (e.g., capacitor, inductor, register, etc.) connected in parallel with each other. In this particular example, the steady state holding component can be implemented by a compensation capacitor. The capacitance of the compensation capacitors can be identical or different to meet system requirements such that the steady state can be recovered within an expected number of switching periods. In addition, each of the compensation capacitors can be connected in parallel with a switch, and each of the compensation capacitors can be connected in parallel with a resistor.

PWM dimming signals PWM1, PWM2, and PWM3 may be converted to a selection signal by switching decoder 405. Loop steady state network 404 can turn on a corresponding switch connected in parallel with the particular compensation capacitor in accordance with the selection signal. An example relationship of input and output signals of switching decoder 405 can be shown below in Table 1. Here, PWM1-3 indicate the three PWM dimming signals, S1-S7 indicate the switching control signals of loop steady state network 404, ON indicates that the PWM dimming signal is high to allow the output current to flow through the LED string, and OFF indicates that the PWM dimming signal is low to prohibit the output current from flowing through the LED string.

TABLE 1

|      | S1 | S2  | S3  | S4  | S5  | S6  | S7  |
|------|----|-----|-----|-----|-----|-----|-----|
| PWM1 | ON | ON  | ON  | ON  | OFF | OFF | OFF |
| PWM2 | ON | ON  | OFF | OFF | ON  | ON  | OFF |
| PWM3 | ON | OFF | OFF | ON  | ON  | OFF | ON  |

In view that there are three LED strings in this example, during operation of multichannel constant current LED controlling circuit 400, there are total $2^3=8$ load states. Outside of the load state whereby all LED strings are turned off, for the remaining 7 load states, corresponding compensation capacitor(s) of loop steady state network 404 can be coupled to the control loop. When a load state occurs for the first time, the compensation capacitor of loop steady state network 404 can store the steady state signal of corresponding load state. When the load state occurs again, because the steady state signal has been stored by the compensation capacitor(s) in prior switching periods, the corresponding compensation capacitor(s) can be coupled to the control loop in order to directly obtain the steady state signal of loop steady state network 404.

Switching decoder 405 and loop steady state network 404 can select corresponding steady state signal in accordance with the PWM dimming signals. The number N of the compensation elements (e.g., capacitors) can be related to the number M of the LED strings of the LED load, where N and M are both positive integers. Loop steady state network 404 can provide the steady state signal corresponding to one load state when the LED load varies. For example, $N=2^M-1$, may indicate that loop steady state network 404 can provide corresponding steady state control signals for all the load states except when all LED strings are turned off. Also for example, $N=2^M$, may indicate that loop steady state network 404 can provide corresponding steady state control signals for all the load states.

The number of the output terminals of switching decoder 405 can be consistent with the number of the steady state holding components. Also, the number of input terminals of switching decoder 405 can be consistent with the number of the PWM dimming signals. When the LED strings are turned on or turned off by the PWM dimming signals, corresponding steady state signal can be selected in accordance with the states of PWM dimming signals PWM1-PWM3 rapidly, in order to improve the loop response speed. Therefore, a steady state can be rapidly recovered when the LED load varies, thus improving the transient response.

Referring back to FIG. 7, multichannel constant current LED controlling circuit 400 can further include OR-gate 406 and AND-gate 407. The input terminals of OR-gate 406 can receive PWM dimming signals PWM1-PWM3, and the output terminal of OR-gate 406 can connect to an input terminal of AND-gate 407. The output terminal of RS flip-flop 403 can connect to the other input terminal of AND-gate 407. When PWM dimming signals PWM1-PWM3 are low, the LED load may be shorted, and the output signal of AND-gate 407 can be low to turn off the power switching transistor Q. Therefore, no output current may be provided to the LED load in order to decrease the power loss at such a light load condition.

Figure 9:
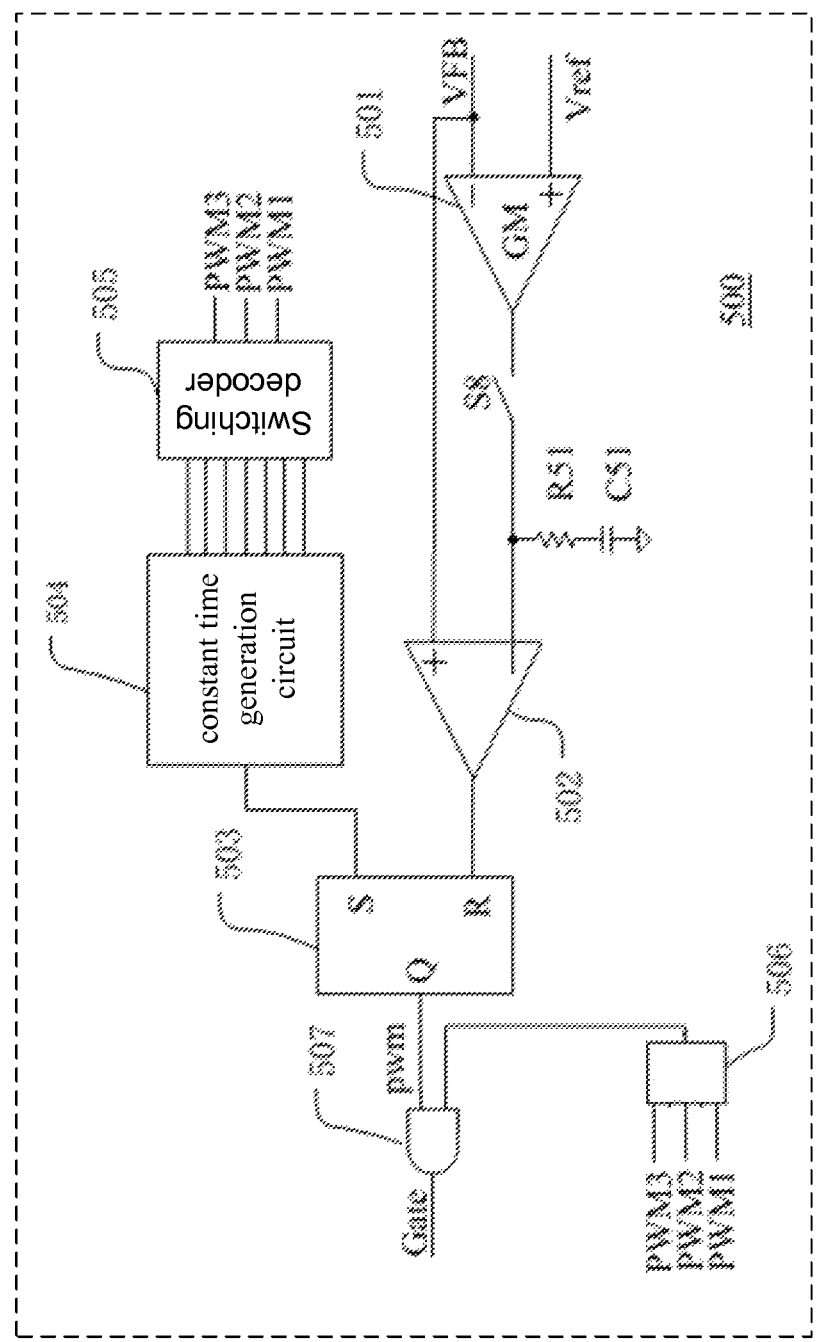
FIG. 9 is a schematic block diagram of an example multichannel constant current LED controlling circuit employing a constant off time control mode, in accordance with embodiments of the present invention.

Referring now to FIG. 9, shown is a schematic block diagram of an example multichannel constant current LED controlling circuit employing a constant off time control mode, in accordance with embodiments of the present invention. Multichannel constant current LED controlling circuit 500 can include transconductance amplifier 501 and a corresponding compensation circuit, comparator 502, and RS flip-flop 503. An inverting input terminal of transconductance amplifier 501 can connect to a current sensing circuit (e.g., including a sensing resistor) to receive current feedback signal VFB, and a non-inverting input terminal can receive reference voltage Vref. A current error signal may be generated at an output terminal of transconductance amplifier 501. Capacitor C51 and resistor R51 can connect in series between the output terminal of transconductance amplifier 501 and ground to form a compensation circuit. Alternatively, the compensation circuit can include only capacitors.

The current error signal can be compensated by the compensation circuit in order to generate a compensation signal. A non-inverting input terminal of comparator 502 can receive current feedback signal VFB, and an inverting input terminal can receive the compensation signal. An output terminal of comparator 502 can connect to a reset terminal of RS flip-flop 503, and a set terminal of RS flip-flop 503 can receive clock signal CLK. RS flip-flop 503 may provide a control signal (e.g., Gate) to a power switching transistor through its output terminal.

During operation of constant current LED controlling circuit 500, when the system is powered on, the power switching transistor can be turned on by RS flip-flop 503 to start a switching period. The current error signal may be in direct proportion with the error between reference voltage Vref and current feedback signal VFB. The current error signal can be compensated by the compensation circuit in order to form the compensation signal. Also, the steady state signal of the compensation signal may vary along with the variation of the LED load.

Current feedback signal VFB and the compensation signal are compared by comparator 502. When current feedback signal VFB is less than the compensation signal, the output signal of comparator 502 may be high. When current feedback signal VFB reaches a level of the compensation signal, the output signal of comparator 502 may transition. The output signal of RS flip-flop 503 can be determined by the output signal of comparator 502 and the output signal of constant time generation circuit 504. When the output signal of RS flip-flop 503 transitions from high to low, the power switching transistor may be turned off for a fixed time interval generated by constant time generation circuit 504 in order to discharge an inductor. Therefore, an inductor current may decrease, and current feedback signal VFB can correspondingly decrease. At the end of the fixed time interval, the power switching transistor may be turned on, and a switching period can be completed. In this way, cycle by cycle, a constant output current can be generated in accordance with current feedback signal VFB and reference voltage Vref. In each switching period, the off time of the power switching transistor may be controlled by constant time generation circuit 504, the length of which can be consistent with the fixed time interval generated by constant time generation circuit 504.

Figure 10:
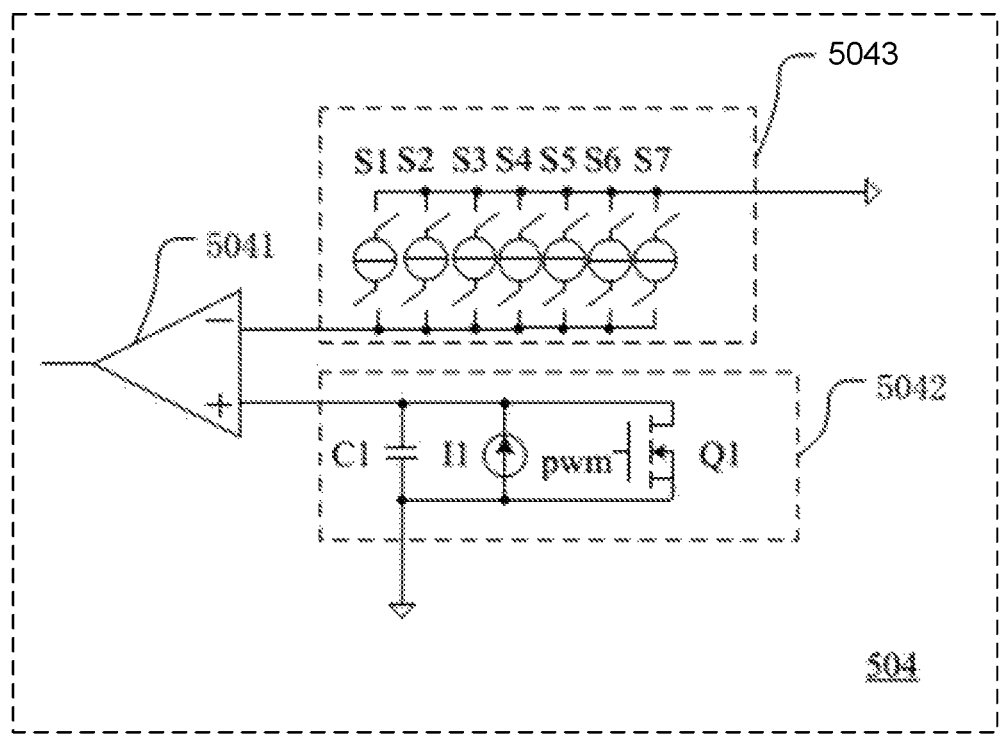
FIG. 10 is a schematic block diagram of an example constant time generation circuit employed in a multichannel constant current LED controlling circuit, in accordance with embodiments of the present invention.

Referring now to FIG. 10, shown is a schematic block diagram of an example constant time generation circuit employed in a multichannel constant current LED controlling circuit, in accordance with embodiments of the present invention. Constant time generation circuit 504 can include reference voltage circuit 5043 to generate a reference voltage signal, slope signal generation circuit 5042 to generate a slope signal with a fixed gradient, and comparator 5041. An output terminal of reference voltage circuit 5043 can connect to an inverting input terminal of comparator 5041. An output terminal of slope signal generation circuit 5042 can connect to a non-inverting input terminal of comparator 5041. Also, and output terminal of comparator 5041 can connect to a set terminal of RS flip-flop 503.

Slope signal generation circuit 5042 can include constant current source I1, capacitor C1, and transistor Q1. The gate of transistor Q1 receive the control signal (e.g., PWM). The common node between constant current source I1 and capacitor C1 can connect to the non-inverting input terminal of comparator 5041. When the control signal is low, transistor Q1 can be turned off. Therefore, capacitor C1 can be charged by current source I1, and the voltage across capacitor C1 may gradually increase. When the control signal is high, transistor Q1 may be turned on, and the voltage across capacitor C1 can decrease to zero. Therefore, a slope signal may generated by slope signal generation circuit 5042 via the control signal.

Reference voltage circuit 5043 can include various voltage sources. In this particular example, reference voltage circuit 5043 can include seven voltage sources coupled in parallel, where the two terminals of each of which are coupled in series with a corresponding switch. The output voltages of the voltage sources can be the same value, or different values. In addition, the output voltages of the voltage sources may be determined in accordance with the LED load, and the value of each of which can be determined in accordance with corresponding steady state signal of different load states of the LED load.

Comparator 5041 may generate a time signal that represents the fixed time interval in accordance with the slope signal and the reference voltage signal. As shown in FIG. 9, switch S8 can connect between the output terminal of transconductance amplifier 501 and the inverting input terminal of comparator 502. When at least one LED string is in operation, switch S8 can be turned on in order to connect transconductance amplifier 501 to the control loop, and a constant off time control mode can be achieved. When all of the LED strings are not in operation, switch S8 may be turned off, and transconductance amplifier 501 may be disconnected from the control loop in order to decrease standby losses.

Figure 11:
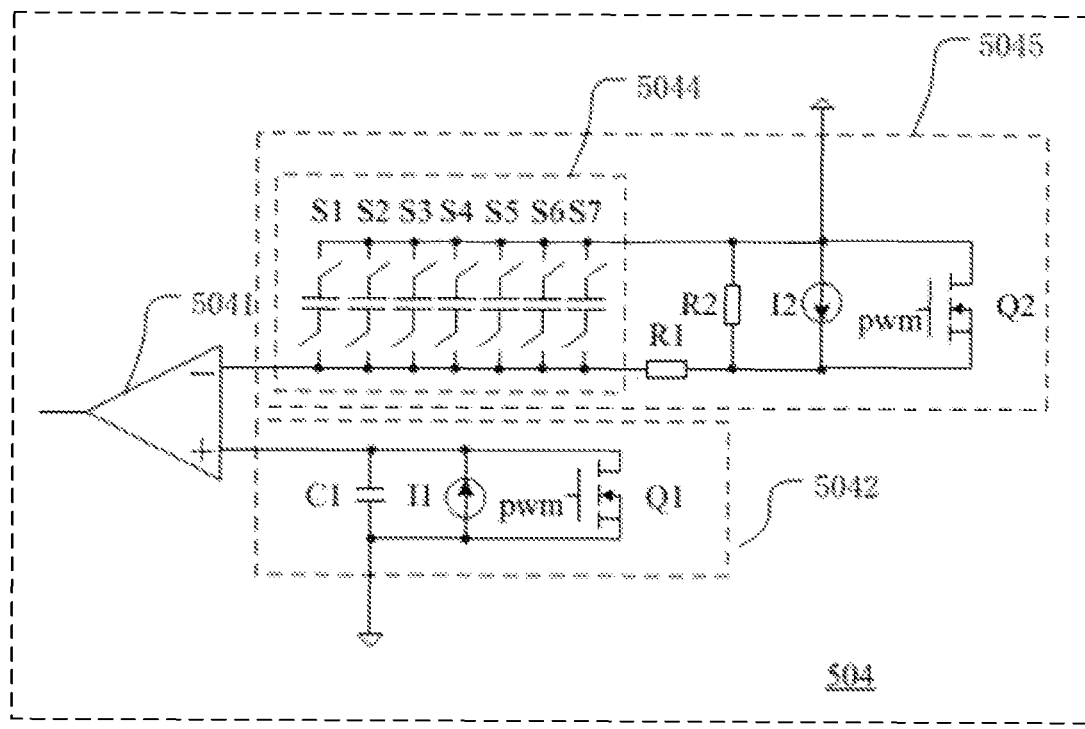
FIG. 11 is a schematic block diagram of another example constant time generation circuit employed in a multichannel constant current LED controlling circuit, in accordance with embodiments of the present invention.

Referring now to FIG. 11, shown is a schematic block diagram of another example constant time generation circuit employed in a multichannel constant current LED controlling circuit, in accordance with embodiments of the present invention. Constant time generation circuit 504 can include reference voltage circuit 5045 for generating a reference voltage signal, slope signal generation circuit 5042 for generating a slope signal with a fixed gradient, and comparator 5041. An output terminal of reference voltage circuit 5045 can connect to an inverting input terminal of comparator 5041, and an output terminal of slope signal generation circuit 5042 can connect to a non-inverting input terminal of comparator 5041. Also, an output terminal of comparator 5041 can connect to a set terminal of RS flip-flop 503.

Slope signal generation circuit 5042 can include constant current source I1, capacitor C1, and transistor Q1. The gate of transistor Q1 can receive the control signal (e.g., PWM). The common node between constant current source I1 and capacitor C1 can connect to the non-inverting input terminal of comparator 5041. When the control signal is low, transistor Q1 is turned off. Therefore, capacitor C1 may be charged by current source I1, and the voltage across capacitor C1 may gradually increase. When the control signal is high, transistor Q1 is turned on, and the voltage across capacitor C1 can decrease to zero. In this way, a slope signal can be generated by slope signal generation circuit 5042 via the control signal.

Reference voltage circuit 5045 can include constant current source 12, transistor Q2, resistors R1 and R2, and capacitor network 5044. Resistor R1 and capacitor network 5044 may form a RC filtering circuit. Current source 12, transistor Q2, and resistor R2 can connect in parallel, where a first common node of which can connect to ground, and a second common node of which can connect to the RC filtering circuit. When the LED load includes three LED strings, capacitor network 5044 can include seven filtering capacitors coupled in parallel. Each of the two terminals of the capacitors can connect in series to a switch (e.g., a transistor). Also, the capacitance of the filtering capacitors can be the same, or different values in some cases. Further, the capacitance of the filtering capacitors may be determined in accordance with the LED load. For example, the value of each of the filtering capacitors can be determined in accordance with a corresponding steady state signal of the different load states of the LED load, in order to control the system to recover to the steady state in expected switching periods, and to meet filtering requirements.

When the control signal is low, transistor Q2 can be turned off. Therefore, the current of current source 12 may flow through resistor R2 in order to generate a voltage signal across resistor R2. When the control signal is high, transistor Q2 can be turned on, and the voltage signal across resistor R2 may decrease to zero. Therefore, the voltage signal at the second common node can be a square waveform that is converted to the reference voltage signal by the RC filtering circuit. Comparator 5041 can generate a time signal that represents the fixed time interval in accordance with the reference voltage signal and the slope signal.

In particular embodiments, a corresponding steady state holding component of constant time generation circuit 504 can be selected when the LED load varies. Therefore, the steady state signal of the current LED load can be directly employed by the control loop in order to control the system to rapidly recover (e.g., in a few switching periods) to the steady state rapidly. In addition, switching decoder 505 (see, e.g., FIG. 9) coupled to constant time generation circuit 504 may be employed to select the steady state signal of the current LED load. For example, the value of a reference voltage signal of constant time generation circuit 504 can be determined in accordance with the PWM dimming signals (e.g., PWM1-PWM3).

Switching decoder 505 can generate a selection signal in accordance with PWM dimming signals PWM1-PWM3, which can be provided to constant time generation circuit 504. Corresponding switches coupled in series with one of the voltage sources may be turned on by the selection signal control in order to select the corresponding voltage source. Thus, the off time of constant time generation circuit 504 can be determined in accordance with variable states of the LED load. The relationship of the input signals and the output signals of switching decoder 505 may be as shown below in Table 2. For example, PWM1-PWM3 can indicate the three PWM dimming signals, S1-S7 can indicate the switch controlling signals of constant time generation circuit 504, and S8 may indicate the switch coupled between the output terminal of transconductance amplifier 501 and the inverting input terminal of comparator 502. Also, ON can indicate that the PWM dimming signal is high, and OFF may indicate that the PWM dimming signal is low.

TABLE 2

|      | S1  | S2  | S3  | S4  | S5  | S6  | S7  | S8  |
|------|-----|-----|-----|-----|-----|-----|-----|-----|
| PWM1 | ON  | ON  | ON  | ON  | OFF | OFF | OFF | OFF |
| PWM2 | ON  | ON  | OFF | OFF | ON  | ON  | OFF | OFF |
| PWM3 | ON  | OFF | OFF | ON  | ON  | OFF | ON  | OFF |

When three LED strings are included by the LED load controlled by three corresponding PWM dimming signals, there are total $2^3=8$ load states for multichannel constant current LED controlling circuit 500. Outside of the load state where all of the three LED strings are turned off, each of the remaining seven load states may correspond to one voltage source or filtering capacitor of the loop steady state/compensation network. The value of the voltage sources or filtering capacitors may be determined in accordance with the steady state signal of the remaining seven load states. Based on luminance and color requirements of the LED load, the load states can be all, or a subset of, the total 8 load states.

Because the voltage sources or filtering capacitors may be determined in accordance with the steady state signal of each of the load states, corresponding voltage source and/or filtering capacitor can be directly selected and coupled to the control loop for each of the load states. In this example, the off time of constant time generation circuit 504 can be determined in accordance with the PWM dimming signals by switching decoder 505 and constant time generation circuit 504. Also, the number N of the voltage sources may correspond to the number M of the LED strings, where N and M are positive integers. Further, loop steady state network 404 can provide the steady state signal for at least one load state when the LED load varies.

The number N of output terminals of switching decoder 505 may be consistent with the number of the voltage sources, and the number of input terminals of switching decoder 505 may be consistent with the number of the PWM dimming signals. When the LED strings are turned on/off by PWM dimming signals PWM1-PWM3, the off time of constant time generation circuit 504 can be controlled to vary along with the PWM dimming signals. Therefore, a steady state off time of constant current LED controlling circuit 500 corresponding to the current load state can be achieved rapidly in order to improve the loop response speed. In this way, the LED driving circuit can be controlled to rapidly recover to the steady state, in order to improve the transient response.

According to this example, and as shown in FIG. 9, multichannel constant current LED controlling circuit 500 may also include NOR-gate 506 and AND-gate 507. An output terminal of NOR-gate 506 can connect to an input terminal of AND-gate 507, and another input terminal of AND-gate 507 can connect to the output terminal of RS flip-flop 503. Input terminals of NOR-gate 506 can receive dimming signals PWM1-PWM3. When dimming signals PWM1-PWM3 are low, all the LED strings may be shorted. As a result, the output signal of AND-gate 507 can be maintained as low to turn off the power switching transistor. Thus, no driving current may be provided to the LED load in this case, in order to decrease standby losses.

The embodiments were chosen and described in order to best explain the principles of the invention and its practical applications, to thereby enable others skilled in the art to best utilize the invention and various embodiments with modifications as are suited to particular use(s) contemplated.

It is intended that the scope of the invention be defined by the claims appended hereto and their equivalents.

What is claimed is:

1. A light-emitting diode (LED) driving circuit, comprising:
    a) a switching power stage circuit configured to generate a pseudo-constant output current to drive an LED load, wherein said LED load comprises a plurality of LED strings coupled in series between outputs of said switching power stage circuit wherein said plurality of LED strings are controlled by a plurality of pulse-width modulation (PWM) dimming signals to be enabled or disabled from a series LED current path to control average currents flowing through said plurality of LED strings;
    b) a loop steady state network comprising a plurality of steady state holding components configured to hold a plurality of steady state control signals that correspond to a plurality of load states of said LED load;
    c) a control loop configured to generate a first control signal in accordance with a current feedback signal that represents said driving current of said LED load and a corresponding one of said plurality of steady state control signals to control operation of said switching power stage circuit;
    d) a switching decoder coupled to said loop steady state network, wherein said switching decoder is configured to generate a selected steady state signal based on said plurality of PWM dimming signals; and
    e) a logic circuit coupled to said control loop and configured to generate a gate control signal to control operation of a power switching transistor of said switching power stage circuit in accordance with said first control signal and said plurality of PWM dimming signals.

2. The LED driving circuit of claim 1, wherein said logic circuit comprises:
    a) a NOR-gate configured to generate a second control signal in accordance with said plurality of PWM dimming signals; and
    b) an AND-gate configured to generate said gate control signal in accordance with said first and second control signals.

3. A light-emitting diode (LED) driving circuit, comprising:
    a) a switching power stage circuit configured to generate a pseudo-constant output current to drive an LED load, wherein said LED load comprises a plurality of LED strings coupled in series between outputs of said switching power stage circuit, wherein said plurality of LED strings are controlled by a plurality of pulse-width modulation (PWM) dimming signals to be enabled or disabled from a series LED current path to control average currents flowing through said plurality of LED stringy,
    b) a loop steady state network comprising a plurality of steady state holding components configured to hold a plurality of steady state control signals that correspond to a plurality of load states of said LED load;
    c) a control loop configured to generate a first control signal in accordance with a current feedback signal that represents said driving current of said LED load and a corresponding one of said plurality of steady state control signals to control operation of said switching power stage circuit;
    d) a switching decoder coupled to said loop steady state network, wherein said switching decoder is configured to generate a selected steady state signal based on said plurality of PWM dimming signals;
    e) said control loop is configured to be operated at a peak current control mode with a constant frequency;
    f) a compensation signal of said control loop is determined by said plurality of steady state control signals;
    g) said control loop comprising a transconductance amplifier configured to generate a current error signal in accordance with said current feedback signal and a reference voltage, wherein said loop steady state network is configured to generate a compensation signal in accordance with said current error signal;
    h) said control loop comprising a first comparator configured to generate a first comparison signal in accordance with said compensation signal and said current feedback signal; and
    i) said control loop comprising an RS flip-flop having a reset terminal coupled to said first comparison signal, a set terminal coupled to a clock signal, and an output terminal configured to generate said first control signal.

4. The LED driving circuit of claim 3, wherein said plurality of steady state holding components comprises:
    a) a plurality of compensation capacitors coupled in parallel; and
    b) a plurality of switching circuits, wherein each switching circuit is coupled in series with a corresponding of said plurality of compensation capacitors to control selection thereof.

5. The LED driving circuit of claim 4, wherein said plurality of compensation capacitors are configured to hold voltage values of said compensation signal.

6. A light-emitting diode (LED) driving circuit, comprising:
    a) a switching power stage circuit configured to generate a pseudo-constant output current to drive an LED load, wherein said LED load comprises a plurality of LED strings coupled in series between outputs of said switching power stage circuit, wherein said plurality of LED strings are controlled by a plurality of pulse-width modulation (PWM) dimming signals to be enabled or disabled from a series LED current path to control average currents flowing through said plurality of LED strings;
    b) a loop steady state network comprising a plurality of steady state holding components configured to hold a plurality of steady state control signals that correspond to a plurality of load states of said LED load;
    c) a control loop configured to generate a first control signal in accordance with a current feedback signal that represents said driving current of said LED load and a corresponding one of said plurality of steady state control signals to control operation of said switching power stage circuit, wherein said control loop is configured to be operated in a constant off time control mode, and wherein an off time of said control loop is determined by said steady state control signals;
    d) a switching decoder coupled to said loop steady state network, wherein said switching decoder is configured to generate a selected steady state signal based on said plurality of PWM dimming signals;
    e) said control loop comprising a transconductance amplifier configured to generate a current error signal in accordance with said current feedback signal and a reference voltage;
    f) said control loop comprising an error compensation circuit configured to generate a compensation signal in accordance with said current error signal;

g) said control loop comprising a first comparator configured to generate a first comparison signal in accordance with said compensation signal and said current feedback signal;
h) said control loop comprising a constant time generation circuit configured to generate a second comparison signal in accordance with said control signal to control an off time of said power switching transistor to be substantially constant, wherein said off time is determined by said plurality of steady state control signals; and
i) said control loop comprising an RS flip-flop having a reset terminal coupled to said first comparison signal, a set terminal coupled to said second comparison signal, and an output terminal configured to generate said first control signal.

7. The LED driving circuit of claim 6, wherein said constant time generation circuit comprises:
a) a slope signal generation circuit configured to generate a slope signal in accordance with said first control signal;
b) a reference voltage generation circuit configured to generate a reference voltage signal; and
c) a second comparator configured to generate said second comparison signal in accordance with said slope signal and said reference voltage signal.

8. The LED driving circuit of claim 7, wherein said plurality of steady state holding components comprises:
a) a plurality of voltage sources; and
b) a plurality of switching circuits, wherein each switching circuit is coupled in series with a corresponding of said plurality of voltage sources to control selection thereof, and wherein said selected of said plurality of voltage sources is configured as said reference voltage signal.

9. The LED driving circuit of claim 7, wherein said steady state holding components comprises:
a) a plurality of filtering circuits; and
b) a plurality of switching circuits, wherein each switching circuit is coupled in series with a corresponding of said plurality of filtering circuits to control selection thereof, and wherein said selected of said plurality of filtering circuits is configured to generate said reference voltage signal.

10. The LED driving circuit of claim 6, wherein said power switching transistor is configured to be turned off and said transconductance amplifier is disconnected from said control loop when all of said plurality of LED strings are turned off.

11. The LED driving circuit of claim 6, wherein a number of said plurality of LED strings M is related to a number of said steady state holding components N by $N=2^M$.

12. The LED driving circuit of claim 1, further comprising a plurality of switches, wherein each of said plurality of switches is coupled in parallel with a corresponding one of said plurality of LED strings, and wherein said plurality of switches are controlled by said plurality of PWM dimming signals.

13. The LED driving circuit of claim 1, wherein said switching power stage circuit comprises a power switching transistor and an inductor, wherein said power switching transistor is configured to be turned off to discharge said inductor.

14. The LED driving circuit of claim 3, further comprising a plurality of switches, wherein each of said plurality of switches is coupled in parallel with a corresponding one of said plurality of LED strings, and wherein said plurality of switches are controlled by said plurality of PWM dimming signals.

15. The LED driving circuit of claim 3, wherein said switching power stage circuit comprises a power switching transistor and an inductor, wherein said power switching transistor is configured to be turned off to discharge said inductor.

16. The LED driving circuit of claim 6, further comprising a plurality of switches, wherein each of said plurality of switches is coupled in parallel with a corresponding one of said plurality of LED strings, and wherein said plurality of switches are controlled by said plurality of PWM dimming signals.

17. The LED driving circuit of claim 6, wherein said switching power stage circuit comprises a power switching transistor and an inductor, wherein said power switching transistor is configured to be turned off to discharge said inductor.

* * * * *